United States Patent [19]
Hodgson

[11] 3,815,937
[45] June 11, 1974

[54] FIFTH WHEEL HAVING A UNIVERSAL KING PIN LOCKING MECHANISM

[76] Inventor: Donald W. Hodgson, 1646 10th St., Arcata, Calif. 95521

[22] Filed: Nov. 9, 1972

[21] Appl. No.: 305,161

[52] U.S. Cl. ............................... 280/434, 280/432
[51] Int. Cl. ............................................. B62d 53/12
[58] Field of Search ............................ 280/434, 437

[56] References Cited
UNITED STATES PATENTS

| | | | |
|---|---|---|---|
| 2,736,574 | 2/1956 | Braunberger | 280/434 |
| 3,171,672 | 3/1965 | Dalton | 280/437 |
| 3,463,512 | 8/1969 | Hodgson | 280/432 |

*Primary Examiner*—Leo Friaglia

[57] ABSTRACT

The bottom half of a fifth wheel includes a horizontally movable locking structure for capturing the neck of the king pin to the bottom half. The king pin locking mechanism is universal in that it is capable of providing at least two vertically offset locking collar positions to accommodate at least two different fifth wheel combinations in which the neck portion of the king pin can take at least two vertically offset positions depending upon whether or not the top half includes concentric lands and grooves for mating with similar lands and grooves on the bottom half. A secondary locking means is provided for locking the first locking means in position. Indicator means are provided for indicating to the operator, in the cab of the tractor, a locked condition of the king pin of the fifth wheel.

9 Claims, 8 Drawing Figures

FIFTH WHEEL HAVING A UNIVERSAL KING PIN LOCKING MECHANISM

DESCRIPTION OF THE PRIOR ART

Heretofore, there have been generally two kinds of fifth wheels. In a first kind, the top and bottom halves of the fifth wheel are generally planar with the bottom half including a flared channel to receive a king pin depending from the top half. As the tractor, having the bottom half carried therefrom, is backed under the top half the king pin rides up the flared channel in the bottom half to a central bore in the bottom half, at which time the king pin trips a locking mechanism which captures the king pin to the bottom half.

The second type of fifth wheel combination is similar to the first except that the mutually opposed abutting surfaces of the top and bottom half have concentric lands and grooves which ride over one another until the king pin reaches the center position at which time the top half drops approximately five-eighths of an inch into the bottom half with the lands and grooves of the two opposed top and bottom halves being journaled together in mating relation. Such a fifth wheel combination is disclosed and claimed in U.S. Pat. No. 3,463,512 issued Aug. 26, 1969 and assigned to the same assignee as the present invention. In the latter fifth wheel, the king pin is locked to the bottom half by means of a locking fork member that is horizontally movable into the recessed neck portion of the king pin for capturing the king pin to the bottom half. Suitable lever arms have been provided for moving the locking fork into position around the king pin.

The problem with the aforecited situation has been that the tractor having the second (grooved) type of bottom half could not be utilized for towing a trailer having the first (planar) type of top half, because the five-eighths inch high lands on the bottom half caused the neck portion of the king pin for the first (planar) type of top half to be vertically displaced by the height of the lands or five-eighths of an inch relative to the vertical position of the neck on the king pin when the second type (grooved) top half was utilized. Thus, in short, there existed no locking device which would be universal for locking king pins that could have their neck portions vertically displaced by as much as five-eighths of an inch.

It would be desirable to have a universal king pin locking arrangement such that the operator having a grooved type of bottom half could operate with trailers having top halves of both the planar and grooved type or conversely an operator having a planar bottom half could operate with either a planar or grooved top half.

SUMMARY OF THE PRESENT INVENTION

The principal object of the present invention is the provision of an improved fifth wheel having a universal king pin locking mechanism.

In one feature of the present invention, the bottom half of the fifth wheel includes a universal locking means having a horizontally movable locking structure for engaging the neck portion of the king pin, such locking structure being capable of providing at least two vertically offset locking collar portions for locking at least two different fifth wheel combinations in which the neck portion of the king pin can take at least two different vertical positions when the king pin of the different fifth wheel combination is located in the proper position to be locked.

In another feature of the present invention, the universal locking structure includes at least three vertically stacked horizontally movable primary locking members defining first and second adjacent pairs of primary locking members the first pair of locking members being horizontally movable to capture the neck portion of the king pin when it is in a first vertical position and the second pair of primary locking members being horizontally movable to capture the king pin when its neck is in a second proper position, whereby a universal locking means is provided.

In another feature of the present invention, a trigger means projects into the locking region to be occupied by the king pin, such that the king pin, when it moves into the locking position, trips the trigger and causes the locking means to move horizontally into locking engagement with the neck portion of the king pin.

In another feature of the present invention, the horizontally movable primary locking members are spring biased and cocked in position to receive the king pin. A trigger is provided which is actuated by the king pin for releasing the cocked locking members causing the springs to urge the locking structure into locking engagement with the king pin.

In another feature of the present invention, secondary locking means is provided for locking the primary locking structure in engagement with the king pin to assure that the king pin is not inadvertently released.

In another feature of the present invention, indicator means are operatively connected with the locking structure for indicating to the operator that the king pin is properly locked to the bottom half.

Other features and advantages of the present invention will become apparent upon a perusal of the following specification taken in connection with the accompanying drawings wherein:

DESCRIPTION OF THE PREFERRED EMBODIMENTS

Figure 1:
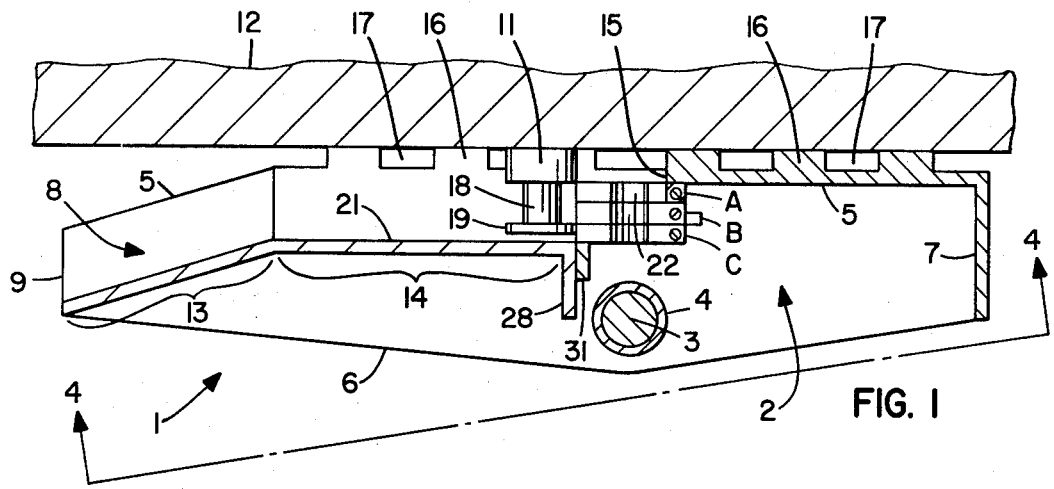
FIG. 1 is a longitudinal cross-sectional view of a fifth wheel having a planar top half and incorporating the universal lock of the present invention.

Referring now to FIG. 1, there is shown a fifth wheel 1 incorporating features of the present invention. The fifth wheel 1 includes a bottom half structure 2 pivotably secured to the tractor, not shown, via a horizontally directed transverse pin 3 captured at its ends via trunnions, not shown. The bottom half structure 2 is pivotably mounted to the pin 3 via a horizontal transverse sleeve 4 coaxially disposed of the pin 3. A skid plate 5, as of ⅜ inch thick steel plate, is secured to the sleeve 4 via the intermediary of a plurality of longitudinally directed ribs 6 which are centrally apertured to receive the sleeve 4 and welded, at the lip of the apertures, to the sleeve 4.

A 2-inch deep skirt 7 is welded about the periphery of the skid plate 5 with the exception of a front region accommodating a longitudinally directed flared guiding channel portion 8, which is open at an entrance end 9 for guiding a king pin 11 fixedly secured and dependent from a top half plate 12 which is fixedly secured to the trailer to be towed. The guiding channel 8 includes an outwardly flared entrance portion 13 designed to initially capture the king pin 11 and to guide the king pin 11 into a narrow channel portion 14 terminated at its inner end by a semi-circular lip 15 of the skid plate 5.

The bottom half 2 is of the grooved type wherein a plurality of concentric lands 16 and grooves 17, as of five-eighths of an inch deep, are formed in the upper surface of the skid plate for mating with a similar set of lands and grooves in a top half structure, but which are not present in the planar type of top half 12 with which the bottom half 2 is being coupled in the fifth wheel combination of FIG. 1.

As the top half 12 slides over the top of the lands 16, the dependent king pin 11 rides within the channel 8 until the upper portion of the king pin is arrested by the centrally disposed semi-circular lip 15 of the skid plate 5.

The king pin 11 is of a conventional standard size, i.e. the king pin 11 has a diameter of 3 inches with a constricted neck portion 18 having a diameter of 2 inches and an axial length of 1.5 inches. The pin terminates in a head portion 19 having an outside diameter of 3 inches and an axial thickness of three-eighths of an inch. In the embodiment of FIG. 1, the head 19 of the king pin rides one-fourth of an inch above the lower surface 21 of the channel 8 in the bottom half structure 2.

Three king pin locking plate members A, B and C are vertically stacked abutting the lower surface of the skid plate 5 at the centrally disposed terminal end of the channel 8. Locking plates A, B and C each include a central elongated opening 22 of transverse dimensions just slightly larger than the diameter of the constricted neck portion 18 of the king pin 11. Plate B has a thickness of seven-eighths of an inch and plate A has a thickness of five-eighths of an inch such that the total thickness of plates A and B, taken as a pair, in the vertical direction is just equal to the axial length of the constricted neck portion 18 of the king pin 11. Plates A, B and C are horizontally slidable on horizontally directed pins 23, 24 and 25 fixedly secured to their respective plates A, B and C, such pins being slidable through aligned apertures in adjacent pairs of said ribs 6.

Locking plates A, B and C are each spring biased, in a manner more fully described below with regard to FIG. 4, to move in a direction out of the paper but are constrained against such motion by means of a trigger mechanism, more fully disclosed below with regard to FIGS. 4 and 5, having a trigger arm which extends into the central region to be occupied by the neck portion 18 of the king pin 11 when the king pin 11 is abutting the lip 15. As the king pin slides into abutment with the retaining lip 15, the neck portion 18 of the pin displaces the trigger mechanism causing the spring biased plates A, B and C to be released. The head portion 19 engages the lower plate C restraining movement of the lower plate C while allowing the upper pair of locking plates A and B to slide in the direction out of the paper, such that the opposite leg portions on opposite sides of the elongated opening 22 in each of the plates A and B can slide around the neck portion 18 of the king pin 11, thus capturing the king pin to the bottom half structure 2.

Figure 2:
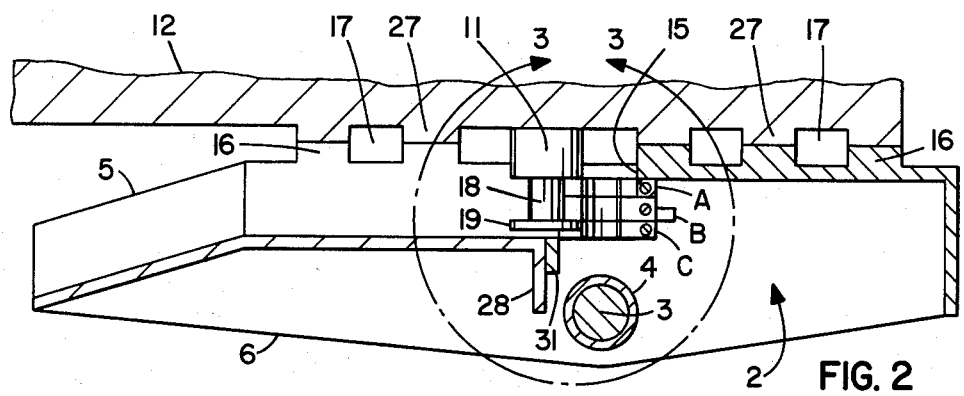
FIG. 2 is a cross-sectional view similar to that of FIG. 1 depicting a grooved top half and incorporating the universal lock of the present invention.

Referring now to FIG. 2, there is shown an alternative fifth wheel combination of a second type, namely, the type having mutually opposed concentric lands and grooves in the opposed top and bottom halves 2 and 12, respectively. The top half 12 slides over the lower grooved skid plate 5 until the king pin 11 abuts the central circular lip 15, at which time the lands in the top plate 12 drop into the corresponding grooves in the skid plate 5 to form concentric mating lands and grooves pivotably rotatable (journaled) with respect to each other in the manner as disclosed and claimed in U.S. Pat. No. 3,463,512 issued Aug. 26, 1969, the disclosure thereof being expressly incorporated by reference herein for a complete disclosure for this type of fifth wheel.

Figure 3:
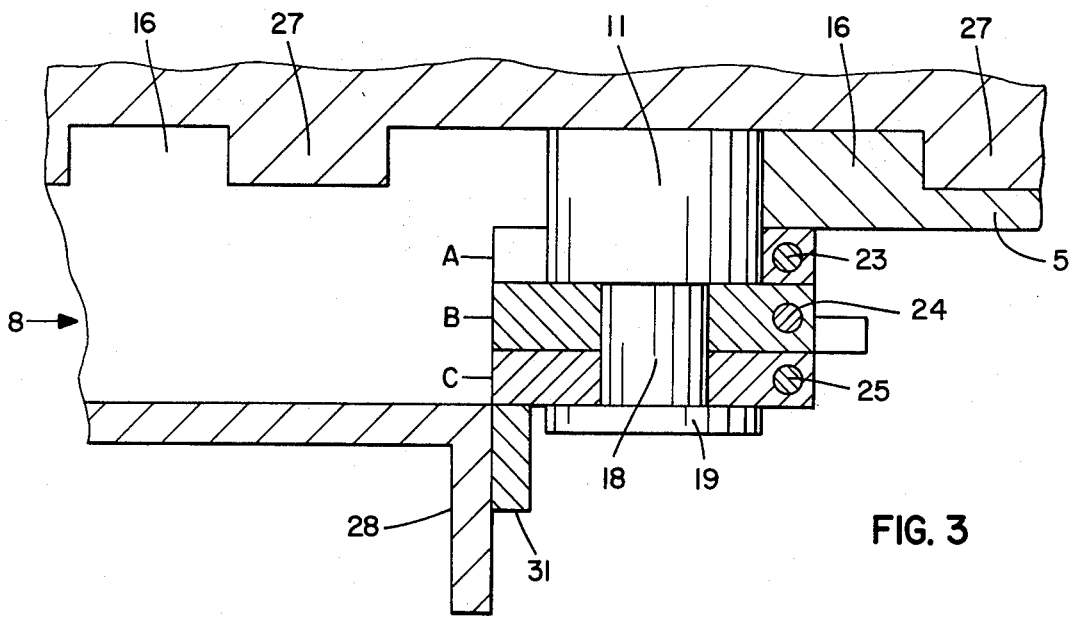
FIG. 3 is an enlarged sectional view of a portion of the structure of FIG. 2 delineated by line 3—3 and depicting the king pin in the locked position.

As the king pin 11 rides up the channel 8, the head portion 19 of the king pin 11 rides approximately one-fourth of an inch above the lower surface 21 of the channel 8, in the manner as previously described with regard to the structure of FIG. 1. However, as the king pin 11 reaches its furthermost inward extent of travel, the top portion of the king pin comes into abutment with the central semi-circular lip 15 and the lands 27 in the top half 12 drop into the corresponding grooves 17 in the skid plate 5. Since the lands 16 and 27 are each five-eighths of an inch deep, the head portion 19 of the king pin drops over a central downturned lip portion 28 at the terminal end of the channel 8, as shown in greater detail in FIG. 3.

As the neck portion 18 reaches the central locking region it displaces the trigger lever, as previously described with regard to the apparatus of FIG. 1, to release the spring biased locking plates A, B and C, respectively. However, because the corners of the lands are rounded, before the king pin 11 triggers the trigger lever, the king pin 11 has dropped approximately one-eighth to one-sixteenth of an inch causing the upper enlarged portion of the king pin 11 to restrain the spring biased translation of the upper locking plate A, while allowing locking plates B and C to move in a direction out of the paper to engage the constricted neck portion 18 of the locking pin 11 in the manner previously described above in regard to the pair of locking plates A and B of FIG. 1.

Thus, the vertically stacked arrangement of three locking plates A, B and C provides two pairs of locking plates, A plus B, and B plus C for locking the king pin 11 to the bottom half 2, regardless of whether the king pin 11 is carried from a planar top half or a grooved top half. In this manner, the locking plates A, B and C provide a universal king pin locking mechanism.

Figure 4:
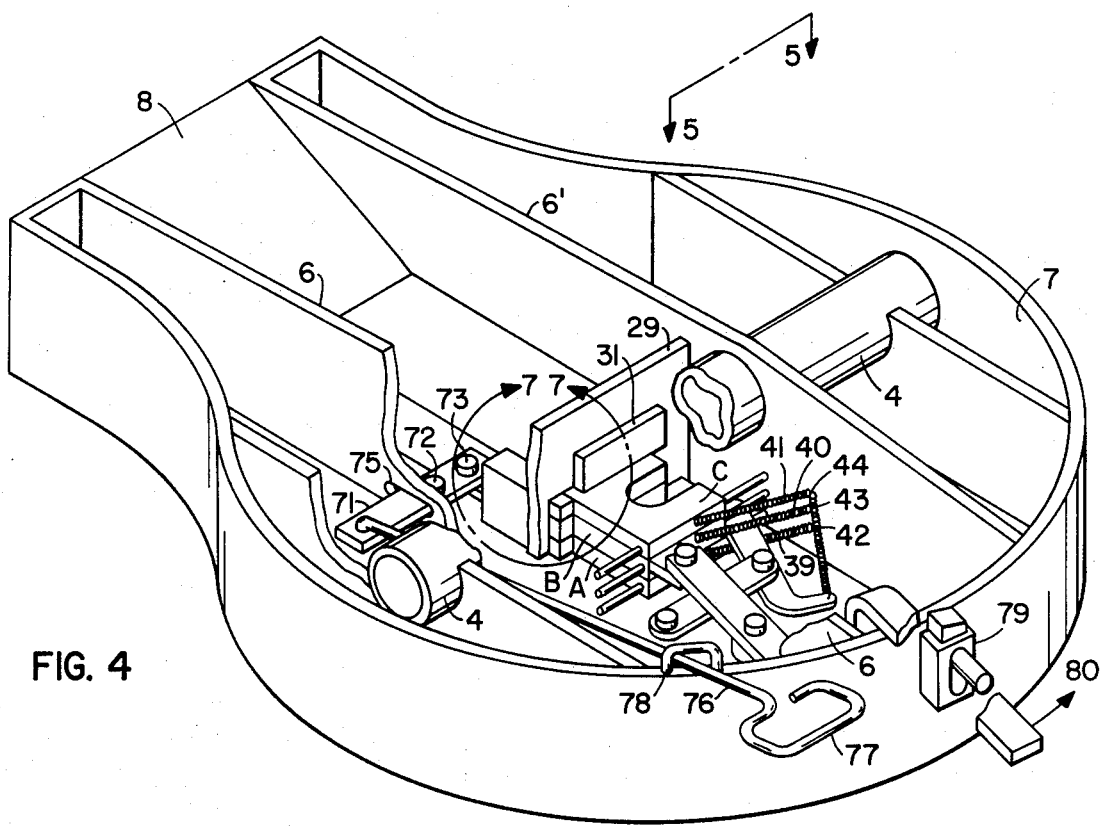
FIG. 4 is an enlarged perspective view of a portion of the structure of FIG. 1 taken along line 4—4 in the direction of the arrows.
Figure 5:
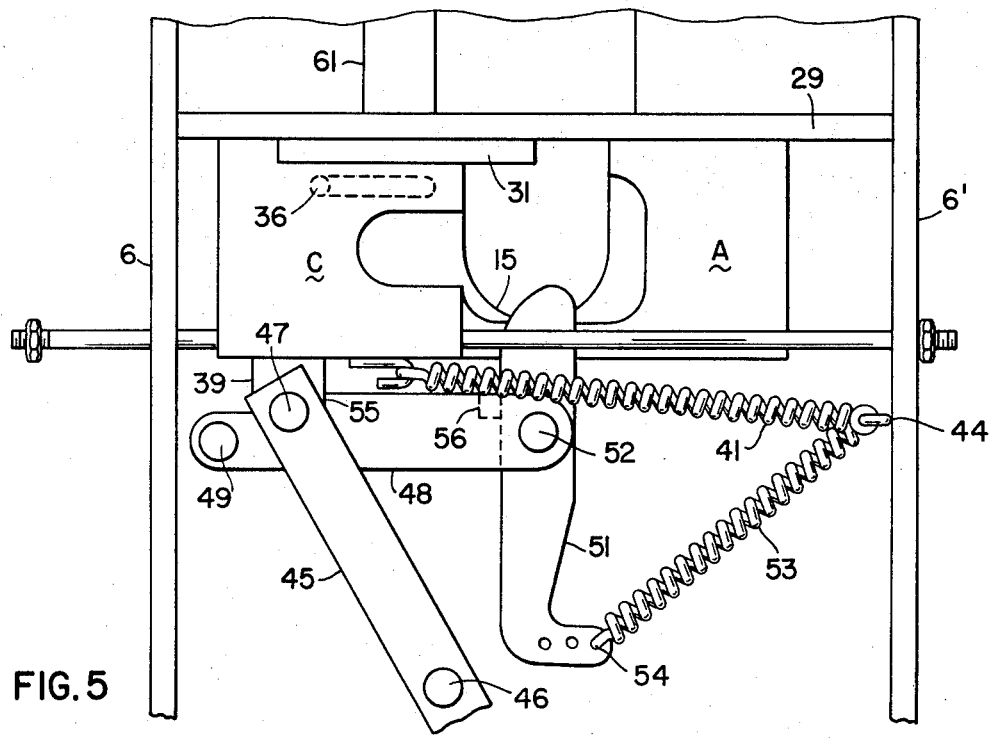
FIG. 5 is an enlarged plan view of a portion of the structure of FIG. 4 delineated by line 5—5.

Referring now to FIGS. 4 and 5 the triggering and cocking mechanism for the universal locking plates A, B and C will be described in greater detail. More particularly, the aforedescribed downturned lip portion 28 at the bottom terminal end of the channel 8, is formed by a transversely directed vertical plate 29 interconnecting adjacent pairs of ribs 6. A bottom rail 31 is affixed to the lip portion 28 of the plate 29 to slidably receive the lower plate C such that the vertical stack of locking plates A, B and C are slidably supported from the rail 31 in the horizontal plane.

Figure 6:
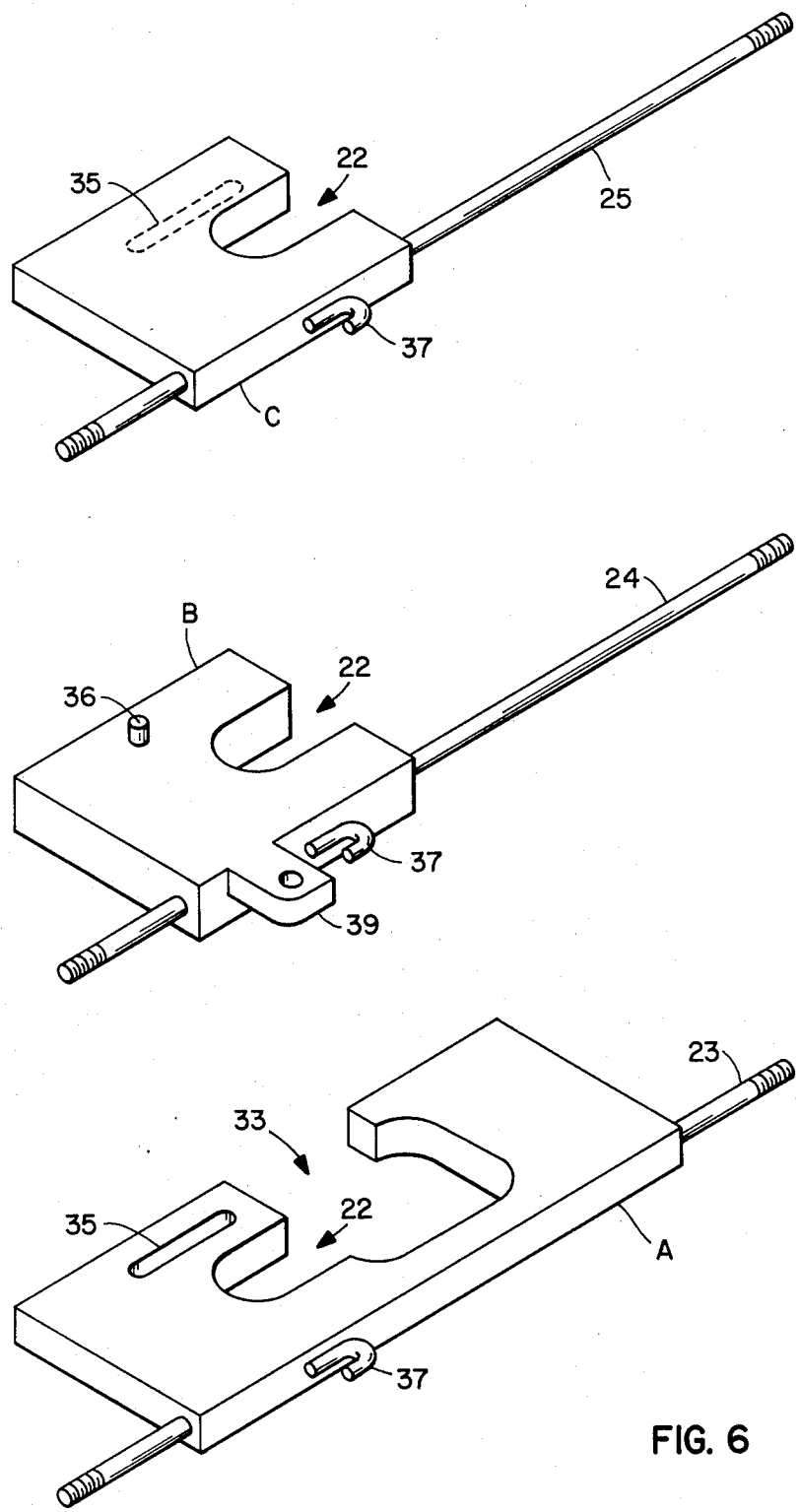
FIG. 6 is an exploded perspective view of the locking plate structure of FIG. 4.

Referring now to FIG. 6 the three locking plates A, B and C are shown in greater detail. Plate A which is adjacent the skid plate 5 includes a generally elongated central opening 22 with a transverse slot portion 33 opening into the central opening 22 such that the widest portion of the king pin 11 may pass through the transverse slot 33 into the central opening 22. The central opening 22 includes a relatively narrow elongated portion having a width, as previously described with regard to FIGS. 1 and 2, sufficient only to capture the constricted neck portion 18 of the king pin 11. A groove 35 is provided in the side of plate A which faces the adjoining locking plate B to receive a pin 36, as of three-eighths inch diameter, extending through plate B and protruding from opposite sides thereof, as by for example three-eighths of an inch.

A hook 37 is provided at the side edge of each of the plates A, B and C to hook one end of a tension spring, as more fully shown in FIG. 4. The slide rods 23, 24 and 25 extend through each of the plates and each rod is threaded at its ends to receive stop nuts. As more clearly shown in FIG. 4, the rods 23–25 extend through corresponding apertures in the ribs 6 and the stop nuts are affixed over the ends to retain the plates between the ribs 6. Plates B and C are similar in that the central openings 22 are generally of the same size with such openings extending into the plates to define fork-like plate structures. The bottom plate C includes a groove 35 in the side adjacent the center plate B for slidably receiving the projection 36 extending from the center plate B into the groove 35. Plate B is seven-eighths of an inch thick and includes a horizontal ear 39 projecting outwardly from the side edge of the plate B to be pivotably connected to a cocking lever 45 as more clearly shown in FIG. 4.

Referring now to FIG. 4 tension springs 39, 40 and 41 are connected to hooks 37 on plates A, B and C, respectively, with the other ends of the tension springs being hooked to eyes 42, 43 and 44 carried from rib 6' for spring biasing the locking plates A, B and C toward rib 6'.

Referring now to FIG. 5 cocking and triggering of the locking plates A, B and C is more clearly shown. More particularly, a cocking lever 45 is pivotably connected to the bottom surface of the skid plate 5 via pin 46. The inner end of the cocking lever 45 is pivotably secured to the cocking ear 39 of plate B via pin 47. A catch arm 48 is pivotably secured to the skid plate 5 via pin 49. A trigger arm 51 is pivotably secured to the other end of the catch arm 48 via pin 52. A tension spring 53 is connected to one end of the pivotable trigger arm 51 at 54 and the other end of the tension spring 53 is hooked to hook 44 carried from rib 6'. The catch lever 48 includes a catching shoulder 55 for catching on ear 39 of plate B. Spring 53 via trigger arm 51 and a stop 56 carried from catch arm 48 serves to spring bias the catching arm 48 toward plate B.

As the cocking lever 45 is pivoted for retracting plate B against the spring tension of tension spring 40, the ear 39 will ride back along the adjacent edge of the catch lever 48 until such time as the shoulder 55 engages the ear 39 at which time plate B will be locked in the retracted or cocked position. As plate B was retracted pin 36, carried from plate B, caught in the end of the slots 35 in the adjacent plates A and C for retracting plates A and C with plate B. Thus, due to pin 36, the adjacent plates are also cocked by plate B.

Trigger arm 51, in the cocked position, projects into the locking region to be occupied by the recessed portion 18 of the king pin 11. As the king pin slides into abutment with the lip 15 in skid plate 5, the trigger lever 51 is pushed away from plate B, pushing catching shoulder 55 over the ear 39 of plate B, thereby releasing plate B and the two adjoining plates A and C. As above described, either plate A or plate C will be restrained by a portion of the king pin 11 such that the appropriate pair of locking plates will slide into locking engagement with the neck portion 18 of the king pin 11, thereby locking the king pin 11.

A secondary locking means 61 is provided for locking the primary locking plates A, B and C in locking engagement with the king pin 11. More particularly, the secondary locking means 61 is more clearly shown in FIGS. 4 and 7 and comprises a generally rectangular housing 62 fixedly secured to the vertical transverse plate 29 adjacent channel 8. Plate 29 is apertured to allow three spring loaded locking bolts 63, 64 and 65 to pass therethrough into locking engagement behind the respective locking plates A, B and C after the respective plates have moved into locking engagement with king pin 11. The locking bolts 63, 64 and 65 have vertical thicknesses corresponding to the vertical thicknesses of the respective plates A, B and C. Like the locking plates A, B and C the center locking bolt 64 includes a pair of projections 66 extending from opposite horizontal sides into suitable longitudinally directed slots 67 and 68, respectively, in bolts 63 and 65. A cocking pin 69 is fixedly secured to the center locking bolt 64 and includes an eye 70 at its outer end for pivotable connection at 73 to a cocking lever 71 pivotably mounted to the skid plate 5 via pin 72. Lever 71 passes through a suitable slot 75 in rib 6 and is actuated by means of a rod 76 hooked to the end of lever 71 and having a handle 77 at the outer end for manual actuation. An eye 78 is affixed to the lower edge of the skirt 7 for guiding the rod 76.

In operation, the locking plates A, B and C are cocked by the operator grasping handle 77 of rod 76 and pulling the handle out from the bottom half 2 for retracting the locking bars 63, 64 and 65 respectively. Concurrently, the operator releases a spring biased latch 79 on the skirt 7 of the bottom half 2 by depressing the spring by pushing down on a radial pin affixed to the spring biased latching bolt which catches the edge of the horizontally movable cocking lever 45. The operator moves the cocking lever 45 in the counter clockwise direction as indicated by arrow 80 in FIG. 4 to retract locking plates A, B and C against the spring bias force of springs 42–44. After latching of plates A, B and C in the cocked position has been accomplished, the ends of the secondary locking bolts 63–65 are covered by the adjacent side edges of the respective locking plates A, B and C.

The tractor is backed into position to receive the king pin 11 within the channel 8. As the king pin 11 comes into the locking region it triggers the trigger arm 51 causing plate B to be released to slide with its corresponding proper adjacent plate A or C into locking engagement with the king pin. As the proper pair of locking plates B and C or B and A slide into locking engagements with the king pin 11, the respective locking bolts 63–65 corresponding to the particular pair of locking plates will slide into locking engagement behind the active locking plates, thereby providing a double lock for the king pin. When the master locking plate B moved into locking engagement with the king pin, it pivoted cocking lever 45 over latch 79 such that the cocking lever 45 was locked into the lock position via latch 79.

The operator can check to see that a double lock is obtained on the king pin 11 by observing the locking bolts 63–65. If only two of such locking bolts are visible this means that a sound double lock was obtained on the king pin 11.

Figure 7:
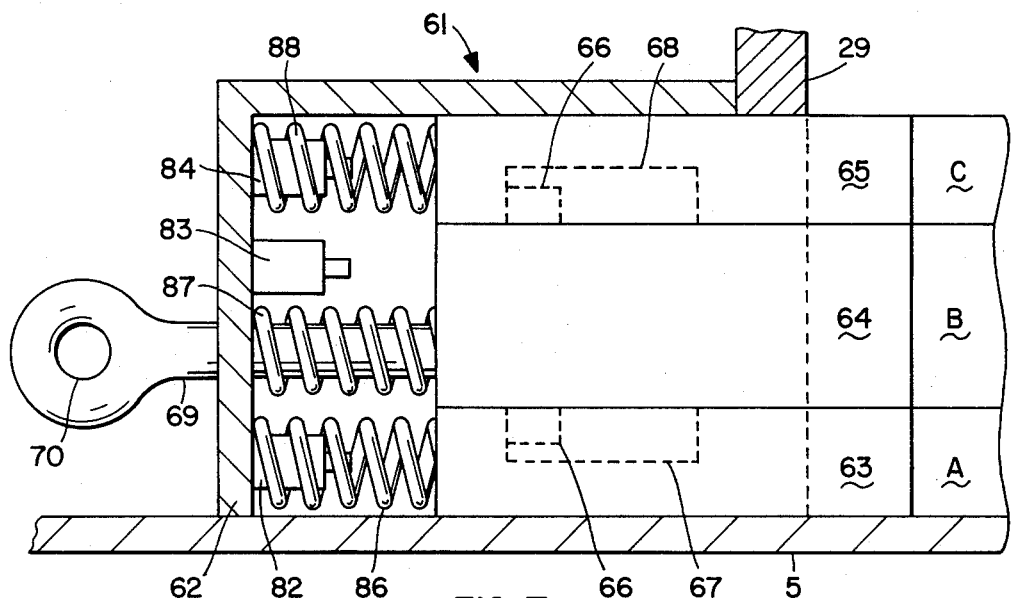
FIG. 7 is an enlarged sectional view of the secondary locking structure of FIG. 4 delineated by line 7—7.
Figure 8:
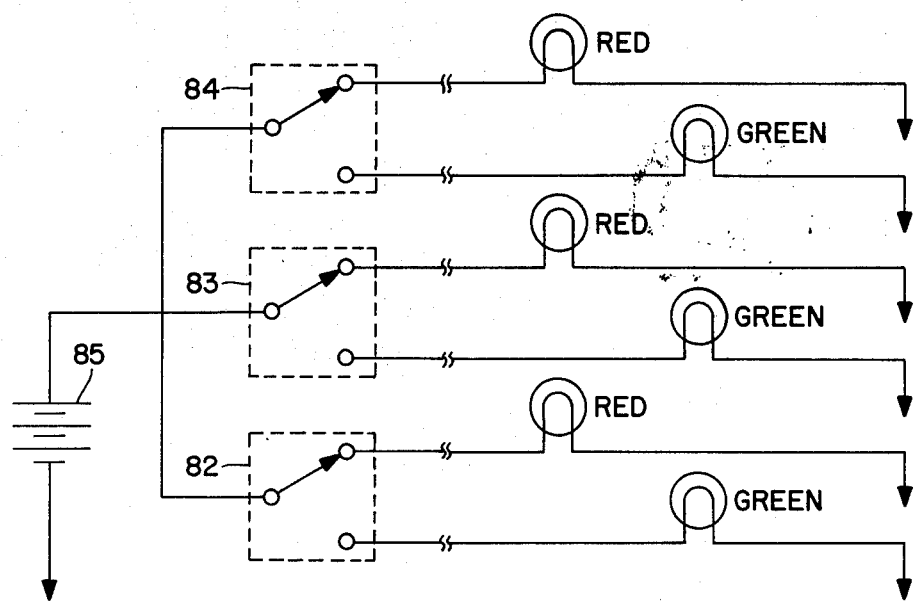
FIG. 8 is a schematic circuit diagram depicting the locking indicating light system of FIG. 7.

In addition, referring now to FIG. 7, three microswitches 82, 83 and 84 are provided at the end wall of the secondary locking housing 62 for actuation by locking bolts 63, 64 and 65, respectively. When the locking bolts are fully retracted, they cause the respective two position microswitch to switch a red indicator light, located in the cab of the tractor, in circuit with a battery 85 as shown in the circuit of FIG. 8. Conversely, when the respective locking bolts 63, 64 and 65 are urged into locking position via respective springs 86, 87 and 88 the corresponding microswitches 82, 83, and 84 respectively are switched to a second position for connecting a green indicator light, located in the cab of the tractor, in circuit with the battery 85 for indicating to the operator that the respective locking bolt has moved into locking engagement behind the respective locking plate.

Although, thus far in the present description, the bottom half has been described and shown as that of the second type (grooved skid plate) this is not a requirement. The universal three plate locking mechanism is equally applicable to a bottom half skid plate of the first or planar type for use with either type of top half.

What is claimed is:

1. In a fifth wheel for releasably coupling a pulling vehicle to a trailer vehicle:
   first half means adapted to be secured to one of the vehicles for releasably receiving a king pin structure affixed to the other vehicle, the king pin structure having a recessed neck portion;
   means for securing said first half means to one of the vehicles;
   universal locking means carried from said first half means for engaging the neck portion of the king pin structure and for vertically capturing the king pin in journaled relation to said first half means to prevent inadvertent disengagement of the king pin from said first half means while allowing relative rotation therebetween;
   said universal locking means including, a locking structure horizontally movable relative to said first half means for movement into engaging relation with the neck portion of the king pin structure, said horizontally movably locking structure having at least two vertically offset portions of finite thickness for selective movement into the recess in the neck of the king pin structure for engagement with the neck of the king pin for locking at least two different fifth wheel combinations in which the recessed neck portion of the king pin can take at least two different vertical positions relative to said horizontally movable locking structure when the king pin of the different fifth wheel combinations is located in the proper position to be locked.

2. The apparatus of claim 1, wherein said locking structure includes three vertically stacked horizontally movable primary locking members defining first and second adjacent pairs of primary locking members, said three stacked primary locking members having a total vertical thickness greater than the vertical extent of the recessed neck portion of the king pin to be captured, said adjacent first and second pairs of said primary locking members each having a vertical extent less than the vertical extent of said neck portion of said king pin such that either said first or second pair of primary locking members are horizontally movable into a locked position of locking engagement with the neck portion of said king pin for locking said king pin to said first half means, and means for urging the proper pair of said primary locking members into engagement with the neck portion of the king pin upon entry into the locking region of said first half means.

3. The apparatus of claim 2 including, trigger means projecting when cocked into the locking region to be occupied by said king pin such that said trigger means is tripped by entry of said king pin into the locking position, and wherein said means for urging said primary locking members into engagement with the king pin includes, spring means operatively connected to said primary locking members for spring biasing said primary locking members toward the locking position, said trigger means when cocked restraining movement of said locking members against the spring bias force of said spring means, said trigger means when tripped releasing said trigger restraint of said spring biased locking members to allow the appropriate first or second pair of said primary locking members to move into locking engagement with the neck portion of the king pin structure.

4. The apparatus of claim 3 including, means for cocking said trigger means and said three locking members.

5. The apparatus of claim 3 wherein said cocking means includes, a cocking lever pivotably connected to said bottom half and operatively interconnected to said trigger means and to said primary locking members for retracting the released locking means and for cocking said three primary locking members against said spring bias force of said spring means.

6. The apparatus of claim 2 including, secondary locking means for locking said respective locking members in their respective lock positions of engagement with the king pin structure.

7. The apparatus of claim 6 including, indicator means operatively interconnected to said secondary locking means for indicating to the operator locking of said secondary locking means.

8. The apparatus of claim 6 wherein said secondary locking means includes, a set of three secondary locking members, secondary spring means for spring biasing said secondary locking members into engagement with respective ones of said primary locking members such that when a respective primary locking member moves into locking engagement with the king pin said secondary locking member will be released by said respective primary locking member to allow said secondary locking member to move into secondary locking engagement with said respective primary locking member.

9. The apparatus of claim 8 including, secondary cocking means carried from said first half means for retracting said secondary locking member against said secondary spring bias force and out of locking engagement with said respective primary locking member to permit cocking of said primary locking members.

* * * * *